United States Patent [19]

Pohl

[11] 4,196,462
[45] Apr. 1, 1980

[54] PROTECTIVE CONTROL CIRCUIT FOR INDUCTION MOTORS

[75] Inventor: Walter J. Pohl, Anchorage, Ky.

[73] Assignee: General Electric Company, Louisville, Ky.

[21] Appl. No.: 910,303

[22] Filed: May 30, 1978

[51] Int. Cl.² .............................................. H02H 7/09
[52] U.S. Cl. ........................................ 361/33; 361/29; 361/86; 318/782; 318/430; 318/445
[58] Field of Search ................... 361/29, 28, 30, 33, 361/23, 86, 90, 91, 92, 88, 89; 318/782, 783, 784, 785, 786, 805, 812, 430, 445, 459

[56] References Cited

U.S. PATENT DOCUMENTS

| | | | |
|---|---|---|---|
| 2,251,891 | 8/1941 | Newton | 62/208 |
| 3,413,520 | 11/1968 | Westbrook | 361/29 |
| 3,633,073 | 1/1972 | Day et al. | 361/22 |
| 3,663,958 | 5/1972 | Crane | 361/90 X |
| 3,671,830 | 6/1972 | Kruper | 318/786 |
| 3,784,846 | 1/1974 | Krick et al. | 361/33 X |
| 3,796,918 | 3/1974 | DeForest et al. | 361/29 X |
| 3,950,675 | 4/1976 | Weber et al. | 361/29 |
| 4,040,117 | 8/1977 | Houser | 361/33 |

Primary Examiner—Partick R. Salce
Attorney, Agent, or Firm—Frank P. Giacalone; Radford M. Reams

[57] ABSTRACT

A solid state electronic circuit for protecting a single phase induction motor against excessive loading by comparing motor start winding voltage with motor source voltage is disclosed, wherein the circuit automatically removes the motor from its driving source upon the occurrence of such excessive loading. An additional feature includes comparing start winding voltage with source voltage to remove the motor from its driving source upon the occurrence of excessive start winding voltage and corresponding excessive high motor speed. A motor starting circuit to permit the start winding voltage to rise to its normal running level and a time delay restarting circuit to permit the motor to automatically restart after elapse of a selected lock out period following removal of the motor from the source due to insufficient or excessive loading is also provided.

8 Claims, 3 Drawing Figures

PROTECTIVE CONTROL CIRCUIT FOR INDUCTION MOTORS

BACKGROUND OF THE INVENTION

This invention relates generally to means for removing an induction motor from its driving source upon the occurrence of excessive motor loading. More specifically, this invention relates to means for comparing induction motor start winding voltage with driving source voltage for removing the motor from its driving source upon the occurrence of insufficient or excessive start winding voltage and corresponding insufficient or excessive motor speed, or both.

It has long been a practice in the prior art to sense motor winding temperature and to provide circuit means for reacting to elevated winding temperatures so as to remove the motor from its driving source to protect it from damage due to a locked rotor condition. While temperature sensors have been improved to the point that they can react relatively quickly to increases in motor winding temperature, temperature sensing type motor protection circuits still must depend upon the actual occurrence of potentially motor damaging temperature conditions in order to protectively react.

My invention substantially overcomes this and other prior art difficulties.

SUMMARY OF THE INVENTION

It is one object of my invention to provide a protection circuit for an induction motor which reacts to start winding voltage to remove the motor from its source when such voltage and corresponding motor speed decrease to a preselected minimum value.

It is another object of my invention to provide a protection circuit for an induction motor which reacts to start winding voltage to remove the motor from its source when such voltage and the corresponding motor speed increase to a preselected maximum value.

It is a further object of my invention to provide a motor protection circuit for an induction motor which reacts to excessively low line voltage or a defective start capacitor.

It is also an object of my invention to provide a motor protection circuit for an induction motor which includes an automatic motor restarting capability after a selected time delay following removal of the motor from its driving source as a result of insufficient or excessive motor loading.

It is yet another object of my invention to provide a protection circuit for an induction motor which reacts to start winding voltage to remove the motor from its source and which includes means for inhibiting such reaction during the initial start up period of the motor to permit the start winding voltage and the corresponding motor speed to rise from zero to its normal running level.

It is a further object of my invention to provide a relatively low cost protective circuit for an induction motor which is particularly suited to use in association with air conditioning and other refrigerant systems.

Briefly, in accordance with my invention, there is provided a protective circuit for use with a single phase induction motor of the type having a start winding and including relay means for controlling the application of an electrical power source to the motor. Comparing means is responsively connected to the start winding and source for generating a first output condition when the voltage across the start winding is equal to or less than a preselected minimum value and for generating a second output condition when the start winding voltage is greater than the minimum value. Means responsively connected to the comparing means for operating the relay means to disconnect the source from the motor in response to the first condition and to connect the source to the motor in response to the second condition is also provided. Lastly, motor starting means operatively connected to the comparing means for generating the second condition during an initial motor start up period to permit the start winding voltage to increase from zero to a level above the minimum value is employed.

These and other objects of my invention will become apparent to those skilled in the art from the following detailed description and attached drawings upon which, by way of example, only the preferred embodiments of my invention are illustrated.

DESCRIPTION OF THE PREFERRED EMBODIMENTS

Figure 1:
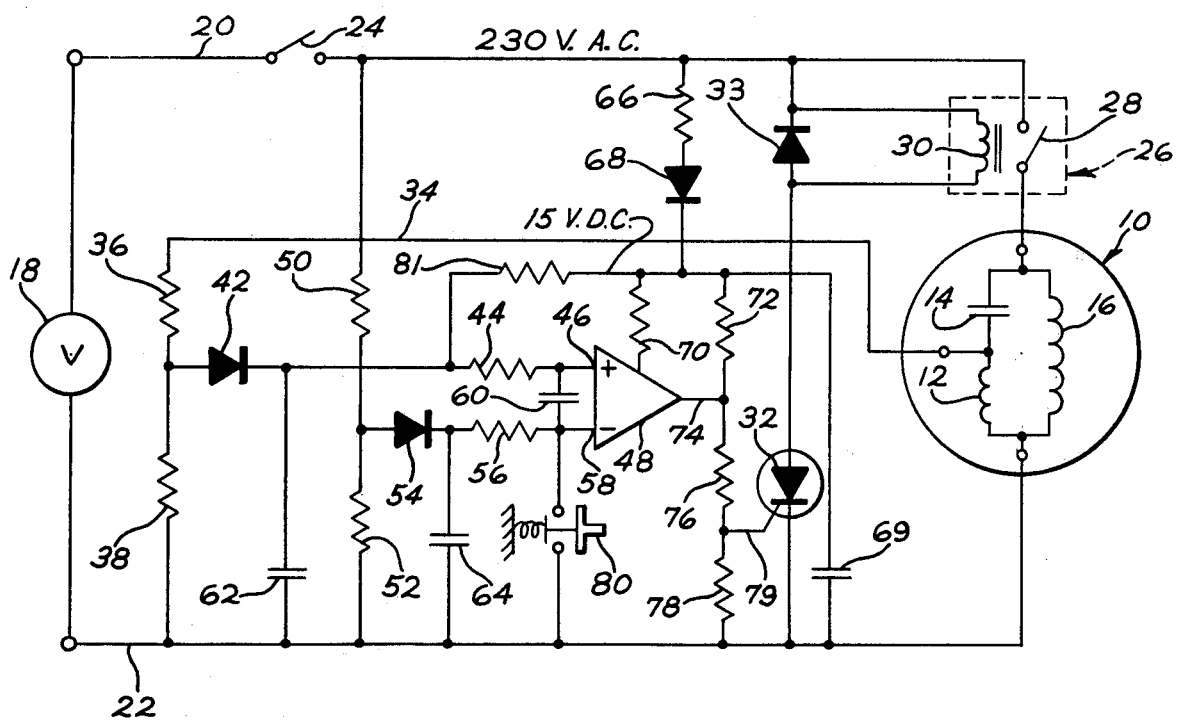
FIG. 1 shows a schematic diagram for a protective circuit for an induction motor thus illustrating one preferred embodiment of my invention.

Referring now to FIG. 1, there is shown, in one preferred embodiment of my invention, a low speed protection circuit for a conventional single phase induction motor 10 having a start winding 12, a start/run capacitor 14, and a run winding 16 connected together in the usual manner as shown.

A conventional a.c. voltage source 18, such as the usual 230 volt, 60 cps commercial utility source, supplies power to operate the motor 10 through a pair of lines 20, 22 upon closure of a manually operable main power switch 24. A motor protecting d.c. relay 26 is provided having a normally open switch 28 connected in the line 20 between the main switch 24 and one side of the motor 10. The switch 28 is magnetically closable by means of a coil 30 connected in series with an SCR 32 across the lines 20, 22. A diode 33 connected across the coil 30 as shown permits the d.c. relay 26 to operate in conjunction with the a.c. lines 20, 22 and the SCR 32.

In accordance with the principles of my invention, the a.c. voltage developed across the start winding 12 when the motor 10 is operative, is applied by a line 34 and the line 22 across a voltage divider network consisting of a pair of series connected resistors 36, 38. A suitably reduced proportion of this a.c. voltage appearing across the resistor 38 is rectified by a diode 42 and the resulting d.c. equivalent voltage is applied through a ripple filter resistor 44 to a high or positive terminal 46 of a comparator 48. The line voltage developed by the source 18 is applied across a second voltage divider network consisting of a pair of series connected resistors 50, 52, a suitably reduced proportion of which is tapped from the resistor 52, rectified by a diode 54 and applied through a ripple filter resistor 56 to a low side or negative terminal 58 of the comparator 48. A capacitor 60 connected between the terminals 46, 58 completes the comparator input ripple filter. A pair of smoothing capacitors 62, 64 remove the 60 cycle a.c. components from the d.c. signals transmitted through the diodes 42, 54 respectively.

A low voltage d.c. power supply to operate the comparator 48 is provided by a resistor 66 connected between the line 20 and one side of a diode 68, the other side of which is connected through a suitable current limiting resistor 70 to the B+ terminal of the comparator 48. A smoothing capacitor 69 is connected between the output side of the diode 68 and the line 22 to connect both in common with respect to a.c. potential. The diode 68 is also connected through a comparator pull up resistor 72 to a comparator output line 74. A third voltage divider network consisting of a pair of resistors 76, 78 is connected between the lines 74 and 22. Voltage developed across the resistor 78 is applied to a gate 79 of the SCR 32 to control the operation of the relay 26. A normally open spring-return switch 80 is connected between the comparator terminal 58 and the line 22 to permit manual restarting of the motor 10 following removal of the same from the source 18 by operation of the control circuit as later more fully explained. Closure of the switch 80 will place the negative terminal 58 of the comparator at d.c. ground potential. Now, provided the positive terminal 46 is at least 15 millivolts more positive than the grounded negative terminal 58, the comparator output line 74 will switch from a low voltage level to a high voltage level to restart the motor 10. To insure that the comparator 48 will trigger when an attempt is made to restart the motor 10 by closing the switch 80, a suitably high value resistor 81 is connected between the output side of the diode 68 and the output side of the diode 42. Accordingly, after the comparator 48 switches to remove the motor 10 from the source, the resistor 81 will maintain a very slight positive voltage on the terminal 46 so that when the restart switch 80 is closed to ground terminal 58, a restarting potential difference will occur across the terminals 46, 58 to trigger the comparator 48.

Figure 2:
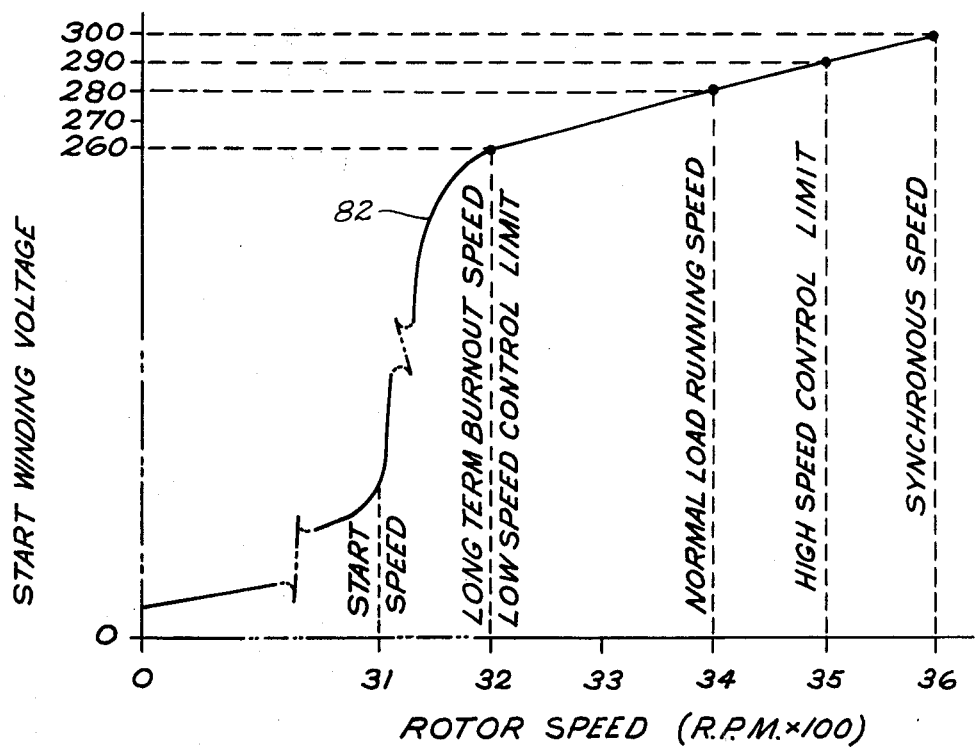
FIG. 2 shows a generalized characteristic curve of start winding voltage vs. a rotor speed for the induction motor of FIG. 1.

To better appreciate the operation of the circuit of the present example, assume that the motor 10 has a start winding voltage vs. rotor speed characteristic as generally represented by the curve 82 shown in FIG. 2. Assume further that the motor 10 is designed to operate under a normal load condition at about 3400 r.p.m.'s as is often the case with typical 230 volt single phase induction motors used to operate compressors in modern air conditioner systems. According to the curve 82, such a rotor speed will produce a start winding voltage well above the source voltage level, in the neighborhood of 280 volts. However, should the motor load increase for any reason, the rotor speed will decrease causing the start winding voltage to decrease relatively gradually toward the knee of the curve 82. Thereafter, relatively small additional increases in the motor load will produce sharp declines in the start winding voltage, down to about 60 volts, after which further loading will cause the motor 10 to stall rapidly into a locked rotor condition. Since a locked rotor condition will typically produce damagingly high current flow through the motor 10, it is important that the control circuit of FIG. 1 remove the motor 10 from the source 18 before this condition can occur.

By adjusting the d.c. voltages representing the start winding voltage and source voltages as presented to the comparator input terminals 46, 58, respectively, the comparator output line 74 can be made to switch from a high voltage state to a low voltage state when the rotor speed and corresponding start winding voltage of the motor 10 decreases to any desired minimum value. Such a minimum voltage value to guard against a locked rotor condition is not critical and may be selected from anywhere along the steep portion of the curve 82, from about 240 volts or more down to about 60 volts. However, since some motors are also susceptible to long term damage due to laboring under a heavy load, even above the knee of the curve 82, it is preferable to select a minimum permissible start winding voltage level above the highest value that will produce long term motor damage, for example, about 260 volts. Once the desired minimum start winding voltage level is selected, the voltage divider networks represented by the resistors 36, 38 and the resistors 50, 52 are designed to produce equal d.c. voltage levels on the terminals 46, 58 at that minimum start winding voltage level. Now when such a minimum level is reached, the comparator output line 74 goes low, to about 0.5 volts, whereby the voltage on the gate 79 falls to a level sufficient to open the SCR 32, de-energize the coil 30 and open the switch 28. Accordingly, the motor 10 is removed from the source 18.

Should the increased load on the motor 10 which produced its removal from the source 18 be of a temporary or self-clearing nature, the switch 80 may be depressed to restart the motor 10 as previously explained. Under such circumstances, the output line 74 will remain high after the switch 80 is released. On the other hand, should the overload condition persist when a restart is attempted, the start winding voltage level will not rise high enough to keep the output line 74 high after the switch 80 is released, whereupon the line 74 will quickly go low once again so as to remove the motor 10 from the source 18.

To complete the present example, TABLE I as follows lists suggested values for the components of the control circuit of FIG. 1.

TABLE I

| COMPONENTS (FIG. 1) | VALUES |
|---|---|
| Motor 10 | Any 230 volt single phase induction motor with a start winding in series with a start/run capacitor |
| Relay 26 | Deltrol 267 |
| Resistor 36 | 250K |
| Resistor 38 | 10K |
| Resistor 44 | 150K |
| Resistor 50 | 250K |
| Resistor 52 | 11.5K |
| Resistor 56 | 150K |
| Resistor 66 | 1200 |
| Resistor 70 | 350 |
| Resistor 72 | 3300 |
| Resistor 76 | 3000 |
| Resistor 78 | 2000 |
| Resistor 81 | 5 Meg. |
| Capacitor 60 | 1.0 MF 3 V. |
| Capacitor 62 | 0.5 MF |
| Capacitor 64 | 0.5 |
| Capacitor 69 | 200 MF |
| SCR 32 | C106M by General Electric |

Figure 3:
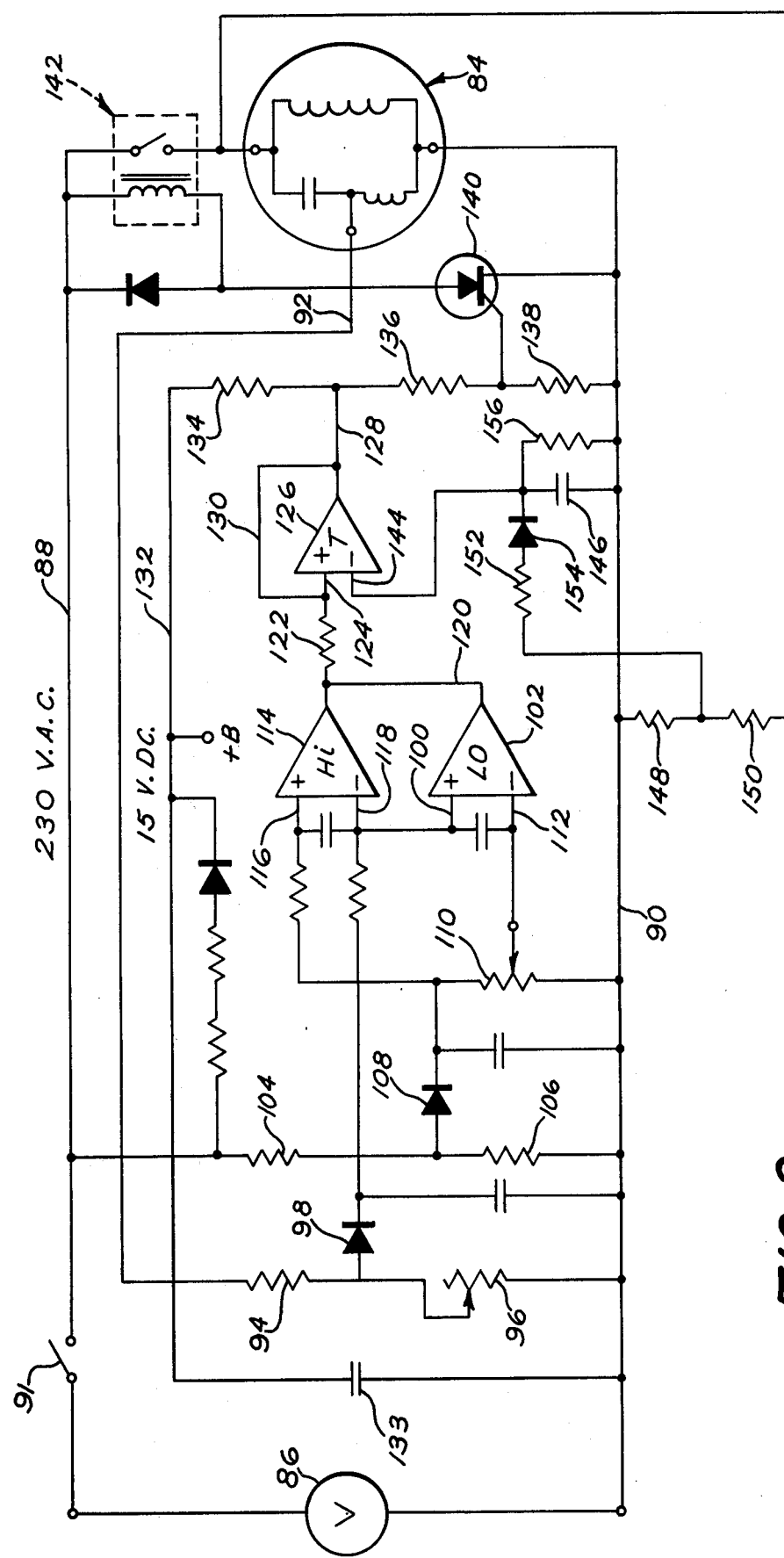
FIG. 3 shows a schematic diagram for a protective circuit for an induction motor with automatic time delayed motor restarting circuitry thus illustrating another preferred embodiment of my invention.

Referring now to FIG. 3, there is shown in another preferred embodiment of my invention, a motor protection circuit for a motor 84, which may be similar to the motor 10 of the previous example.

The circuit of the present example provides not only low rotor speed cut-off for the motor 84 similar to the circuit of FIG. 1, but also provides high rotor speed cut-off as well. A timer circuit is also provided for automatically restarting the motor 84 after a selected time lapse following a low or high speed shut down thereof by the protection circuit.

A suitable voltage source 86 drives the motor 84 through a pair of main power lines 88, 90 upon closure of a main switch 91. Start winding voltage is applied between a line 92 and the line 90 across a voltage divider network consisting of a resistor 94 and a potentiometer 96. A selected portion of the start winding voltage is taken from the potentiometer 96, rectified by a diode 98 and applied to a positive or high side terminal 100 of a comparator 102. The source voltage is applied across a second voltage divider network consisting of a pair of resistors 104, 106, a suitable proportion of which is taken from the latter, rectified by a diode 108 and applied across a potentiometer 110. A portion of the d.c. voltage appearing across the potentiometer 110 is applied to the low side or negative terminal 112 of the comparator 102. The circuit of the comparator 102 thus controls the low start winding voltage cut-off point of the motor 84 in a manner similar to the circuit of FIG. 1.

As an additional feature of the present example, a high start winding voltage comparator 114 is provided which compares a d.c. equivalent of the source voltage applied to its positive terminal 116 to a d.c. equivalent of the start winding voltage as applied to its negative terminal 118. The proportions of these d.c. voltages as presented to the comparator 114 should be adjusted so that the negative terminal voltage will rise to equality with the positive terminal voltage as the start winding voltage and rotor speed of the motor 84 increase to a selected maximum value. Such a high speed condition can occur where the load on the motor 84 decreases for any reason, as for example, where refrigerant is lost from an air conditioner compressor system being driven by the motor 84. Thus, the high speed protection feature of the circuit of the present example can be employed to protect components of a system being driven by the motor 84 from damage apart from the motor 84 itself.

The comparators 102, 114 both have output terminals which are connected together by an output line 120 so that the line 120 will go low when either of the comparator output terminals goes low. Conversely, the line 120 will only remain in a high voltage state so long as both of the comparators 102, 114 are conductive. The output line 102 is connected through a resistor 122 to a positive input terminal 124 of a timer comparator 126. An output line 128 of the comparator 126 is connected in common with the positive terminal 124 by means of a line 130. A 15 v.d.c. bus 132 supplies B+ to operate the comparators 102, 114 and 126 in the same manner as explained in the previous example. A smoothing capacitor 133 connected between the lines 132 and 90 makes them common to one another with respect to a.c. potential. The same d.c. voltage is also applied across a voltage divider network consisting of three resistors 134, 136 and 138. The output line 128 is connected between the resistors 134 and 136 and the gate of an SCR 140 is connected between the resistors 136 and 138. The SCR 140 conducts to close a motor protecting relay 142 and apply the source 86 to the motor 84 in the same manner as in the previous example.

Triggering of the timer comparator 126 actuates an RC time delay network connected between a negative terminal 144 of the comparator 126 and the line 90 in the following manner. A capacitor 146 connected between the terminal 144 and the line 90 is charged from a voltage divider network consisting of a pair of resistors 148, 150 connected between the lines 88, 90 as shown, during the time that the motor 84 is operative. The capacitor charging path contains the resistor 150 and a resistor 152 connected through a diode 154 to the terminal 144. The resistors 150 and 152 and the capacitor 146 should be selected for rapid charging of the capacitor 146, for example, about one second delay time, slightly longer than the start up time of the motor 84.

The discharging path of the capacitor 146 is through a resistor 156 connected between the terminal 144 and the line 90. It is preferable that the values of the capacitor 146 and the discharge resistor 156 be selected so that the time lapse necessary to pull the voltage on the terminal 144 down to the voltage level of the terminal 124, following the switching of the output line 120 to a low voltage state, is about one minute. Of course, shorter or longer delay times may be selected as desired. The rate at which the capacitor 146 discharges determines the length of time that the relay 142 will remain de-energized following a high or low speed motor shut-down by the circuit of FIG. 3. Accordingly, the discharge rate of the capacitor 146 through the resistor 156 controls the delay time between successive attempts by the control circuit to automatically restart the motor 84 following a high or low speed shut-down thereof.

To complete the present example of the motor speed control circuit of my invention, TABLE II lists suggested values for the various components of the circuit of FIG. 3. Those components of FIG. 3 not specifically referred to in the foregoing explanation perform functions similar to the corresponding components shown and identified in FIG. 1. The suggested values for such components are the same as the corresponding components of FIG. 1 as given in TABLE I.

TABLE II

| COMPONENTS (FIG. 3) | VALUES |
| --- | --- |
| Motor 84 | Same as Motor 10 as listed in TABLE I |
| Relay 142 | Same as Relay 26 as listed in TABLE I |
| Potentiometer 96 | 10K |
| Potentiometer 110 | 100K |
| Resistor 94 | 250K |
| Resistor 104 | 250K |
| Resistor 106 | 10K |
| Resistor 122 | 4K |
| Resistor 134 | 3K |
| Resistor 136 | 3K |
| Resistor 138 | 2K |
| Resistor 148 | 10K |
| Resistor 150 | 160K |
| Resistor 152 | 500K |
| Resistor 156 | 10M |
| Capacitor 133 | 0.5 MF |
| Capacitor 146 | 200 MF |
| SCR 140 | Same as SCR 32 as listed in TABLE I |
| Comparators 102, 114 and 126 | Three of four available comparators found on a Quad-Comparator No. 3302M as manufactured by Motorola Fairchild |

In typical operation, the circuit of FIG. 3 is initially energized by closure of the main switch 91. At the instant of closure, the capacitor 146 is fully discharged, whereby the negative timer comparator terminal 44 is at d.c. ground potential. At the same time, the 15 v.d.c. line 132 is energized to apply B+ to each of the comparators 102, 114 and 126 such that at least a small positive voltage will appear on the positive timer comparator terminal 124. Accordingly, the output line 128 quickly goes high such that the SCR 140 conducts to energize the relay 142 and apply the motor 84 across the source 86. And, of course, as soon as the comparator 126 triggers, the voltage on the output line 128 and on the positive input terminal 124 will jump quickly in accordance with the voltage drop across the pull-up resistor 134. At start up, the high speed cut-off comparator 114 will be conductive so that only the low speed cut-off comparator 102 need be rendered conductive to raise the line 120 to a high potential to hold the relay 142 in an energized state. The line 120 must go high before the capacitor 146 has time to charge to a value sufficient to raise the voltage level on the negative terminal 144 to the voltage level of the positive terminal 124. If the resistors 150, 152 and the capacitor 146 are selected to provide a one or two second delay in equalizing the voltage on the terminals 124, 144, the start winding voltage generated by the motor 84 will have sufficient time to rise above the minimum motor cut-off value, provided the motor load is within a normal operational range.

The voltage divider networks consisting of the resistor 94 and potentiometer 96 and the resistors 104 and 106, are selected to set the desired high start winding voltage and corresponding high speed cut-off value of the motor 84. Thereafter, the potentiometer 110 may be adjusted to set the desired low start winding voltage and corresponding low speed cut-off value. The motor 84 will thus be maintained in an operative condition so long as its start winding voltage and corresponding rotor speed remain within these limits. Now suppose that during operation of the motor 84, the motor load changes for any reason such that either the high or low start winding voltage limit is exceeded. Accordingly, either the high speed cut-off comparator 114 or the low speed cut-off comparator 102 will trigger to switch the output line 120 to a low voltage state, approximately 0.3 volts or less. As a result, the voltage applied to the terminal 124 of the timer comparator 126 will fall to a level equal to or less than the potential on the negative terminal 144, the comparator 126 will trigger the output line 128 to a low voltage state, also about 0.3 volts, and the SCR 140 will become non-conductive to deenergize the relay 142. Accordingly, the motor 84 will be disconnected from the source 86.

Immediately upon shut-down of the motor 84 as above explained, the now fully charged capacitor 146 commences discharging through the resistor 156 to lower the voltage on the negative terminal 144 at an exponential rate. The value of the discharge resistor 156 should be selected so that the discharge time of the capacitor 146 maintains the decreasing voltage level on the terminal 144 above the 0.3 volt level of the terminal 124 for a reasonable time period, for example, about one minute. The time required to decrease the voltage on the negative terminal 144 from its value when the capacitor 146 is fully charged to the voltage level of the terminal 124 following switching of the potential on the line 128 from a high to a low voltage state is the motor lock-out time during which period the motor 84 can not be restarted. Of course, other delay periods, either more or less than one minute, can be selected for any particular application as desired. After the voltage level of the terminal 144 falls to or below the voltage level of the terminal 124, the comparator output 128 will again go high in an attempt to automatically restart the motor 84. The charging rate of the capacitor 146 should be set so as to allow the motor 84 to reach operating speed before the voltage level on the terminal 144 increases to the voltage level on the terminal 124. Now, provided the motor speed reaches a level within the operating range of the comparators 102, 114, both will have triggered the line 120 to a high voltage level above the voltage level that can be reached by the negative terminal 144 upon obtaining a full charge on the capacitor 146. In this event, the line 128 will remain high and the motor 84 will have been successfully restarted.

If, on the other hand, the motor speed and start winding voltage level do not reach a point within the operating range selected, the comparators 102 will again trigger the output line 120 to a low voltage state and the timer comparator output line 128 will go low to remove the motor 84 from the source 86 once again. The process of automatic attempted restarts will thereafter occur at regular intervals determined by the discharge rate of the capacitor 146 until the abnormal motor load condition is corrected. Those skilled in the art will recognize the desirability in some cases of providing a conventional automatic counter circuit for use in conjunction with the protection circuit of FIG. 3, to cause the motor 84 to be permanently removed from the source 86 after a given number of unsuccessful automatic attempts by the circuit to restart the motor 84.

Although the subject invention has been described with respect to specific details of certain preferred embodiments thereof, it is not intended that such details limit the scope of the subject invention otherwise than as set forth in the following claims.

I claim:

1. A protective control circuit for use with a single phase induction motor of the type having a start winding comprising relay means for controlling the application of an electrical power source to said motor, comparing means responsively connected to said start winding and source for generating a first output signal when the voltage across said start winding is less than a preselected minimum value, and for generating a second output signal when said start winding voltage is greater than said minimum value, means responsively connected to said comparing means for operating said relay means to disconnect said source from said motor in response to said first signal and to connect said source to said motor in response to said second signal, and motor starting means operatively connected to said comparing means for generating said second signal during an initial motor start up period to permit said start winding voltage to increase from zero to a level above said minimum value.

2. The control circuit of claim 1 wherein said comparator means comprises a comparator having a positive and a negative input terminal and an output terminal, a first voltage divider network connected across said start winding, a first diode connected between said first voltage divider network and said positive terminal for rectifying a selected portion of said start winding voltage and for applying the resulting d.c. voltage to said positive terminal, a second voltage divider network connected across said source, a second diode connected between said second voltage divider network and said negative terminal for rectifying a selected portion of said source voltage and for applying the resulting d.c. voltage to said negative terminal, and means connected to said diodes for filtering a.c. components out of said resulting d.c. voltages.

3. The circuit of claim 1 wherein said operating means comprises a voltage divider network responsively connected to an output terminal of said comparator means, and a gate controlled transister device responsively connected to said voltage divider network and operatively associated with said relay means, said device being conductive so as to actuate said relay means to connect said motor to said source when said output terminal is in a high voltage condition and so as to deactivate said relay means to disconnect said motor from said source when said output terminal is in a low voltage condition.

4. The circuit of claim 1 further comprising second comparator means responsively connected to said start winding and source for generating a third output signal when the voltage across said start winding is greater than a preselected maximum value and for generating a fourth output signal when said start winding voltage is less than said maximum value, and means responsively connected to said second comparator means for operating said relay means to disconnect said source from said motor in response to said third signal and to connect said source to said motor in response to said second and fourth signals.

5. The circuit of claim 2 wherein said motor starting means comprises switch means for selectively connecting said negative terminal to d.c. ground, and biasing means for raising the d.c. voltage level of said positive terminal by an amount sufficient to gate said comparator to generate said second signal during said initial motor start up period.

6. A protective control circuit for use with a single phase induction motor of the type having a start winding comprising relay means for controlling the application of and electrical power source to said motor, comparator means responsively connected to said start winding and source for generating a first output signal when the voltage across said start winding is greater than a preselected maximum value and for generating a second output signal when said start winding voltage is less than said maximum value, and means responsively connected to said comparator means for operating said relay means to disconnect said source from said motor in response to said first signal and to connect said source to said motor in response to said second signal.

7. A protective control circuit for use with a single phase induction motor of the type having a start winding comprising relay means for controlling the application of an electrical power source to said motor, first comparing means responsively connected to said start winding and source for generating a first output condition when the voltage across said start winding is less than a preselected minimum value and for generating a second output condition when said start winding voltage is greater than said minimum value, second comparing means responsively connected to said start winding and source for generating a third output condition when the voltage across said start winding is greater than a preselected maximum value and for generating a fourth output condition when said start winding voltage is less than said maximum value, timer comparing means responsively connected to said first and second comparing means for generating a first output state in response to said second and fourth output conditions, and for generating a second state in response to said first and third output conditions, means responsively connected to said timer comparing means for operating said relay means to disconnect said source from said motor in response to said second state and to connect said source to said motor in response to said first state, and time delay means operatively associated with said timer comparing means for inhibiting the switching of said timer comparator from said second state to said first state for a preselected lock-out time period, and for maintaining said first state for a preselected lock-in time period following the switching of said timer comparing means from said second state to said first state, sufficient to permit the start winding voltage of said motor to rise from zero to a level between said minimum and maximum values.

8. The circuit of claim 7 wherein said timer comparing and time delay means comprises a comparator having a positive and a negative terminal and an output terminal, said output terminal being connected in common with said positive terminal, a capacitor connected between one side of said source and said negative terminal, a voltage divider network, one side of which is connected to said one side of said source, the other side of which is connected to the other side of said source between said relay means and motor, a charging resistor, one side of which is connected to said network, a diode connected between said charging resistor and said negative terminal, and a discharging resistor connected across said capacitor.

* * * * *